(12) United States Patent
Spicer et al.

(10) Patent No.: US 10,812,278 B2
(45) Date of Patent: *Oct. 20, 2020

(54) DYNAMIC WORKLOAD CAPPING

(71) Applicant: BMC SOFTWARE, INC., Houston, TX (US)

(72) Inventors: Paul C. Spicer, Torrance, CA (US); Steven DeGrange, Saratoga, CA (US); Hemanth Rama, Fremont, CA (US); Sridhar Gangavarapu, Fremont, CA (US); Robert Perini, Ashburn, VA (US); Edward Williams, North Las Vegas, NV (US)

(73) Assignee: BMC Software, Inc., Houston, TX (US)

( * ) Notice: Subject to any disclaimer, the term of this patent is extended or adjusted under 35 U.S.C. 154(b) by 562 days.

This patent is subject to a terminal disclaimer.

(21) Appl. No.: 15/620,447

(22) Filed: Jun. 12, 2017

(65) Prior Publication Data

US 2017/0279623 A1 Sep. 28, 2017

Related U.S. Application Data

(63) Continuation of application No. 14/840,708, filed on Aug. 31, 2015, now Pat. No. 9,680,657.

(51) Int. Cl.
*H04L 12/14* (2006.01)
*G06F 9/50* (2006.01)
*G06Q 30/04* (2012.01)

(52) U.S. Cl.
CPC .......... *H04L 12/1435* (2013.01); *G06F 9/505* (2013.01); *G06F 9/5077* (2013.01); *G06Q 30/04* (2013.01); *G06F 2209/504* (2013.01)

(58) Field of Classification Search
CPC .... G06F 9/50; G06F 9/5027; G06F 2209/504; G06Q 10/06311; G06Q 20/14
See application file for complete search history.

(56) References Cited

U.S. PATENT DOCUMENTS 5,457,793 A  10/1995  Elko et al.
5,493,668 A  2/1996  Elko et al.
(Continued)

OTHER PUBLICATIONS

Extended European Search Report for European Application 16186394.9, dated Dec. 16, 2016, 10 pages.
(Continued)

*Primary Examiner* — George Chen
(74) *Attorney, Agent, or Firm* — Brake Hughes Bellermann LLP

(57) ABSTRACT

A mainframe computing system includes a central processor complex, a plurality of billing entities, each billing entity having a respective capacity limit, and a workload manager that schedules work requested by the plurality of billing entities on the central processor complex and tracks, by billing entity, a rolling average of millions of service units. The mainframe also includes a dynamic capping policy that identifies a maximum MSU limit, a maximum cost limit, a subset of the plurality of billing entities, and, for each billing entity in the subset, information from which to determine a MSU entitlement value and cost entitlement value. The mainframe also includes a dynamic capping master that adjusts the respective capacity limits of the subset of the plurality of billing entities at scheduled intervals based on the dynamic capping policy to favor billing entities having high-importance workload within the maximum MSU limit and maximum cost limit.

20 Claims, 7 Drawing Sheets

(56) References Cited

U.S. PATENT DOCUMENTS

| | | | |
|---|---|---|---|
| 5,758,339 | A | 5/1998 | Barton et al. |
| 5,923,874 | A | 7/1999 | Koenig |
| 6,253,224 | B1 | 6/2001 | Brice et al. |
| 6,578,068 | B1 | 6/2003 | Bowman-Amuah |
| 6,587,938 | B1 | 7/2003 | Eilert et al. |
| 6,910,153 | B2 | 6/2005 | Kapulka et al. |
| 6,912,493 | B1 | 6/2005 | Scheel et al. |
| 6,985,951 | B2 | 1/2006 | Kubala et al. |
| 7,054,934 | B2 | 5/2006 | Graupner et al. |
| 7,069,558 | B1 | 6/2006 | Stone et al. |
| 7,096,469 | B1 | 8/2006 | Kubala et al. |
| 7,120,704 | B2 | 10/2006 | Pickel et al. |
| 7,209,967 | B2 | 4/2007 | Kitamura |
| 7,281,249 | B2 | 10/2007 | Tarui et al. |
| 7,305,520 | B2 | 12/2007 | Voigt et al. |
| 7,430,741 | B2 | 9/2008 | Ayachitula et al. |
| 7,543,303 | B2 | 6/2009 | Le et al. |
| 7,685,251 | B2 | 3/2010 | Houlihan et al. |
| 7,752,415 | B2 | 7/2010 | Vaupel |
| 7,827,021 | B2 | 11/2010 | Deitch |
| 7,844,709 | B2 | 11/2010 | Aman et al. |
| 7,900,206 | B1 | 3/2011 | Joshi et al. |
| 7,987,464 | B2 | 7/2011 | Day et al. |
| 8,108,869 | B2 | 1/2012 | Jackson |
| 8,312,456 | B2 | 11/2012 | Hepkin et al. |
| 8,365,182 | B2 | 1/2013 | Groetzner et al. |
| 8,458,714 | B2 | 6/2013 | King et al. |
| 8,489,742 | B2 | 7/2013 | Clubb et al. |
| 8,495,627 | B2 | 7/2013 | Barsness et al. |
| 8,782,322 | B2 | 7/2014 | Houlihan et al. |
| 8,875,143 | B2 | 10/2014 | Piazza et al. |
| 8,904,405 | B1 | 12/2014 | Peeters et al. |
| 8,949,364 | B2 | 2/2015 | Miloushev et al. |
| 9,038,090 | B1 | 5/2015 | Peeters et al. |
| 9,069,621 | B2 | 6/2015 | Jacobs et al. |
| 9,081,613 | B2 | 7/2015 | Bieswanger et al. |
| 9,342,372 | B1 | 5/2016 | Tran et al. |
| 10,643,193 | B2 | 5/2020 | Tran et al. |
| 2001/0044705 | A1 | 11/2001 | Vardi et al. |
| 2002/0091786 | A1 | 7/2002 | Yamaguchi et al. |
| 2002/0124043 | A1 | 9/2002 | Otero Perez et al. |
| 2002/0129274 | A1 | 9/2002 | Baskey et al. |
| 2004/0168170 | A1 | 8/2004 | Miller |
| 2004/0226015 | A1 | 11/2004 | Leonard et al. |
| 2006/0037027 | A1 | 2/2006 | Carlson et al. |
| 2007/0150894 | A1 | 6/2007 | Barsness et al. |
| 2007/0283349 | A1 | 12/2007 | Creamer et al. |
| 2008/0082983 | A1 | 4/2008 | Groetzner et al. |
| 2011/0154353 | A1 | 6/2011 | Theroux et al. |
| 2012/0290862 | A1 | 11/2012 | Brown et al. |
| 2013/0055277 | A1 | 2/2013 | Ashish et al. |
| 2013/0091282 | A1 | 4/2013 | Tontiruttananon et al. |
| 2013/0132570 | A1 | 5/2013 | Lopez Nieto |
| 2013/0346969 | A1 | 12/2013 | Shanmuganathan et al. |
| 2014/0244841 | A1 | 8/2014 | Gulati et al. |
| 2014/0245311 | A1 | 8/2014 | Dodge et al. |
| 2014/0278641 | A1 | 9/2014 | Kleehammer et al. |
| 2014/0281348 | A1 | 9/2014 | Nayar et al. |
| 2014/0317265 | A1 | 10/2014 | James et al. |
| 2014/0358944 | A1 | 12/2014 | Brower et al. |
| 2015/0067696 | A1 | 3/2015 | Peeters et al. |
| 2015/0095089 | A1 | 4/2015 | Ginis et al. |
| 2015/0106245 | A1 | 4/2015 | Mirajkar et al. |
| 2016/0283926 | A1 | 9/2016 | Tran et al. |
| 2017/0063561 | A1 | 3/2017 | Spicer et al. |
| 2017/0199564 | A1 | 7/2017 | Saxena et al. |

OTHER PUBLICATIONS

"BMC Intelligent Capping for zEnterprise User Guide", BMC Software, Inc., Nov. 2014, 114 pages.

Ashton, et al., "Two Decades of Policy-Based Storage Management for the IBM Mainframe Computer", IBM Systems Journal, vol. 42 Issue 2, 2003, pp. 302-321.

Bhatia, "Capacity Planning and Performance Management on IBM PowerVM Virtualized Environment", Available online at <https://neerajbhatia.files.wordpress.com/2011/10/powervm_capacity_planning.pdf>, 2011, 34 pages.

Blagrave, et. al, Request for Information (RFI) to zIT Consulting, BMC-RFI, Revision 3, Mar. 27, 2012, 22 pages.

Buscaylet, et al., "IT Infrastructure & Operations Management—Best practices", Crip Infrastructure and Production, available online at <http://www.itiforums.com/fichiers/2013_03_14_18_58_59_LIVREBLANC_MAINFRAME_UK_2012_WEB.pdf>, Sep. 2012, 76 pages.

Ebbers, et al., "Best Practices for Lotus Domino on System z: z9 and zSeries", available online at <http://www.redbooks.ibm.com/redbooks/pdfs/sg247209.pdf>, Jan. 2006, 122 pages.

Hitachi Data Systems, "Hitachi Compute Blade With Logical Partitioning Feature", available online at <https://www.hds.com/assets/pdf/hitachi-datasheet-compute-blade-logical-partitioning-lpar.pdf>, Apr. 2013, 2 pages.

Hitachi Data Systems, "Hitachi Virtual Storage Platform—Architecture Guide", available online at <https://www.hds.com/assets/pdf/hitachi-architecture-guide-virtual-storage-platform.pdf>, 2011, 48 pages.

Hofbauer, "Surene-BMC—All customer's Guide z/OZ", zCOST Presentation, Sep. 27, 2007, 33 pages.

Kyne, et al., "z/OS Intelligent Resource Director", available online at <http://www.redbooks.ibm.com/redbooks/pdfs/sg245952.pdf>, Aug. 2001, 430 pages.

Moss, et al., "ITGSE UK Conference 2010: Session GC z/OS Software Cost Optimization—Several Options for TCO Reduction", Nov. 2, 2010, 20 pages.

Moss, Michael W., "Re: Cap software CPU utilization", Google Forums, available online at <https://groups.google.com/forum/#!topic/bit.listserv.ibm-main/58b_vTag03l>, Aug. 14, 2009, 1 page.

Softwareonz, "AutoSoftCapping (ASC) vWLC without the Performance Problems!", available online at <http://www.ohvcmg.org/download/61/>, 2010, 28 pages.

Softwareonz, "Sysplex Aggregation with Help from ASC Software from SoftwareOnZ—A user's experience", available online at <www.ohvcmg.org/download/76/>, 2012, 20 pages.

Softwareonz, "Using AutoSoftCapping (ASC) to Manage Your z/OS Software Bill", available online at <http://www.ohvcmg.org/download/103/>, Apr. 2014, 41 pages.

Ufacik, "Introduction to Mainframe Hardware", available online at <https://cow.ceng.metu.edu.tr/Courses/download_courseFile.php?id=3821>, 2012, 64 pages.

Zcost Management, "Capacity Planning and Cost Control", CMG Ohio, Oct. 11, 2012, 13 pages.

Zcost Management, "zCost Management—Customer presentation", available online at <http://www-304.ibm.com/partnerworld/gsd/showimage.do?id=27155>, 2009, 43 pages.

Zcost Management, "zCost Management GSE z/OS Systems workgroup", available online at <http://www.gsebelux.com/system/files/zCost%20PRES%20GSE%20Belux%20zOS%202011%20Event%20Eng%20Full.pdf>, Dec. 14, 2011, 56 pages.

Sysplex: IBM Systems Complex—Mainframes.com; http://www.mainframes.com/Sysplex.html; Dec. 4, 2019; 3 pages.

200

Policy Name: 280 DYCWLMPB   Activated          11:29
MSU Limit: 285 400
Cost Limit: 295 6367
                    290
Low-Importance: Combined
Peak 4HRA: 395                Peak Time: 05APR2014 13:43

| LPAR or Group | 210 T | 215 Proportion | 220 Entitlement | 221 MSU Cost | 223 Cost Entitlement | 225 Priority | 230 Low-Imp Wkld% | 235 Adj Low Imp Wkld% | 240 4HRA | 245 DefCap or GCL | Min (4HRA, DC\|GCL) | % MSU Limit |
|---|---|---|---|---|---|---|---|---|---|---|---|---|
| DB2GROUP | G | 183 | 73 | 10 | 730 | 2 | 79 | 63 | 93 | 93 | 93 | 23.2 |
| DEFAULT | G | 157 | 63 | 15 | 945 | 3 | 82 | 82 | 80 | 80 | 80 | 20.0 |
| INSA | L | 59 | 21 | 5 | 105 | 4 | 49 | 58 | 5 | 7 | 5 | 1.2 |
| SJSC | L | 52 | 21 | 7 | 147 | 2 | 79 | 63 | 42 | 42 | 42 | 10.5 |
| SJTEST2 | G | 555 | 222 | 20 | 4440 | 1 | 88 | 52 | 175 | 178 | 175 | 43.7 |
| *Policy | T | | | | | | | | 395 | | 395 | 98.1 |

FIG. 2

DYNAMIC WORKLOAD CAPPING

RELATED APPLICATION

This application is a continuation of, and claims priority to, U.S. application Ser. No. 14/840,708, filed Aug. 31, 2015, which is hereby incorporated by reference in its entirety.

BACKGROUND

Mainframe computers are large, multi-processor computing devices able to perform thousands of tasks every second. Work on mainframe computers is often measured in millions of service units (MSUs), which is a measure of the processor (CPU) capacity used to execute the work. Mainframe customers are often charged for their software that runs on a mainframe based on peak MSU usage through a Monthly Software License Charge (MLC). The customer may be assigned a product MSU cost as part of the license. To determine the MLC, the mainframe operating system generates monthly reports that determine the customer's system usage (in MSUs) during every hour of the previous month using a rolling average (e.g., a 4-hour rolling average) recorded by each billing entity for the customer. The hourly usage metrics are then aggregated together to derive the total monthly, hourly peak utilization for the customer, which is used to calculate the bill for the customer. A billing entity may be either a logical partition of the mainframe resources (LPAR) or a capacity group. To control costs, the customer may assign each LPAR a consumption limit, in that the LPAR cannot use more MSUs than allotted in its respective consumption limit. A capacity group is a collection of LPARs defined as having a collective name and a shared consumption limit (i.e., the LPARs in the group share the consumption limit).

SUMMARY

Systems and methods provide a system for dynamically adjusting the capacity limits of mainframe billing entities for a customer to favor high importance work and limit low importance work to achieve maximum high importance throughput for the lowest possible cost across all billing entities. The system can adjust capacity limits to take into account the changing workload costs and importance, in both kind and amount, with a single SYSPLEX or across multiple SYSPLEXes. The system may take into account the business priority assigned to each billing entity when evaluating workloads as well as the costs for shifting workload limits and may use these factors to dynamically set capacity limits for each billing entity. The system may dynamically adjust billing entity capacity limits within a maximum MSU limit and a maximum cost limit, set by the customer, so that important workloads receive priority to requested resources while ensuring usage and costs stay within the limits set by the customer to keep costs down.

In one general aspect, a mainframe computing system includes a central processor complex, a plurality of billing entities, a billing entity being a logical partition of the mainframe computing system or a group of logical partitions, each billing entity having a respective capacity limit, and a workload manager that schedules work requested by the plurality of billing entities on the central processor complex and tracks, by billing entity, a rolling average of millions of service units (MSUs). The mainframe computing system also includes a dynamic capping policy for the central processor complex stored in non-transitory memory, the dynamic capping policy identifying a maximum MSU limit, a maximum cost limit, a subset of the plurality of billing entities, and, for each identified billing entity, information from which to determine an MSU entitlement value and a cost entitlement value. The mainframe computing system may also include a dynamic capping master that adjusts the respective capacity limits of the subset of the plurality of billing entities at scheduled intervals based on the dynamic capping policy to favor billing entities having high-importance workload within the maximum MSU limit and maximum cost limit.

According to another general aspect, a method of adjusting capacity limits for billing entities identified in a dynamic capping policy on a mainframe is provided. The dynamic capping policy may include, for each billing entity identified in the policy, information from which to determine a millions of service unit (MSU) entitlement value and a cost entitlement value. The method may include determining a pool of service units from billing entities that have respective rolling averages under respective MSU entitlement values, determining a pool of billing entities that have respective rolling averages above respective MSU entitlement values, each billing entity in the pool having a priority assigned, and determining a cost pool based on unused cost entitlement units from billing entities that have respective rolling averages under respective MSU entitlement values. The method may further include determining, from the pool of billing entities, a favored billing entity that has a highest priority and a lowest deficit ratio, adjusting the capacity limit for the favored billing entity above the MSU entitlement value with borrowed MSUs from the pool of service units, the borrowed MSUs being bounded by the cost pool, and repeating determining a favored billing entity and adjusting until either the pool of service units is empty or the cost pool is empty.

According to one aspect, a method includes obtaining workload data from each of a plurality of billing entities identified in a dynamic capping policy, a billing entity being a logical partition of a mainframe computing system or a group of such logical partitions, each billing entity having a respective capacity limit, and the workload data including a rolling average of millions of service units (MSUs), determining an entity pool, a service unit pool, and a cost pool for the plurality of billing entities based on, for each billing entity, the respective rolling average MSUs, a respective MSU entitlement value, and a respective MSU cost, and dynamically adjusting capacity limits of the plurality of billing entities based on, the entity pool, the service unit pool, and the cost pool.

Another aspect of the disclosure can be embodied on a computer-readable medium having recorded and embodied thereon instructions that, when executed by a processor of a computer system, cause the computer system to perform any of the methods disclosed herein.

The details of one or more implementations are set forth in the accompanying drawings and the description below. Other features will be apparent from the description and drawings, and from the claims.

BRIEF DESCRIPTION OF THE DRAWINGS

FIG. 2 is an example of a user interface for maintaining a dynamic capping policy, according to an implementation.

Like reference symbols in the various drawings indicate like elements.

DETAILED DESCRIPTION

In calculating a bill for work on a mainframe, not all work is billed the same. Some products have significantly higher rates than others, so it is in the best interest of the customer to keep service consumption as low as it can on billing entities (i.e., LPARs or capacity groups) running the most expensive products. One way this can be accomplished is by lowering the capacity limits, also referred to as defined capacities, during periods of high usage in an attempt to keep consumption as low as possible. But this may result in some work not receiving the CPU resources it needs, in effect slowing down the execution and completion of that work. This may have very undesirable effects on important workloads. Since meeting performance objectives of high importance work is deemed a necessary part of shifting resources, customers tend to raise capacity limits to meet the demand and avoid disruption to their clients. But raising the capacity limit even for as little as an hour can increase costs substantially. Accordingly, a dynamic capping system intelligently controls the capacity limits based on workload importance within a maximum capacity limit and cost limit set by the customer. The dynamic capping system factors in the cost differences between billing entities when redistributing work units to ensure that the adjusted capacity limits do not increase costs. A dynamic capping thus intelligently adjusts the capacity limits to maximize throughput while minimizing cost.

Figure 1:
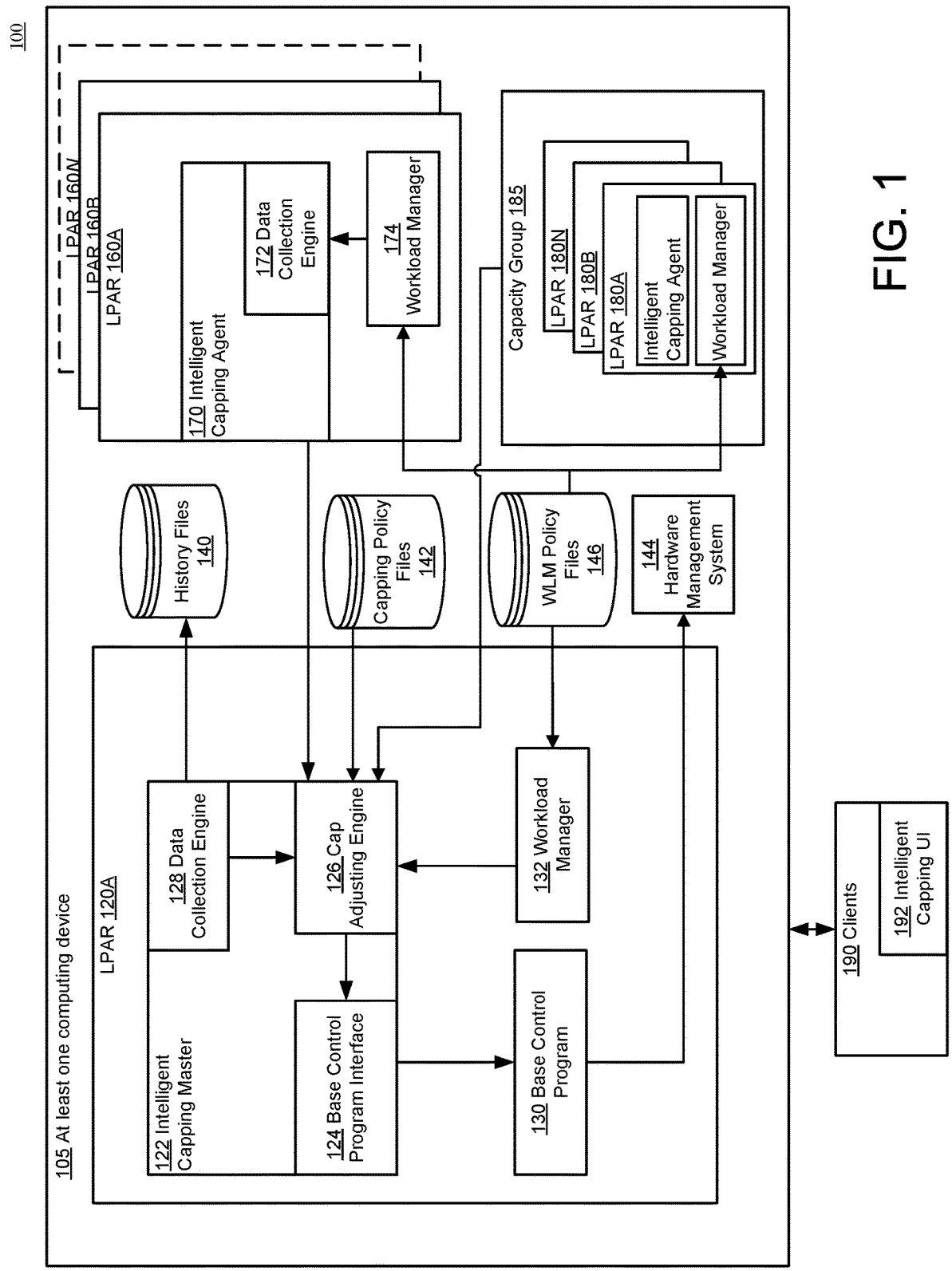
FIG. 1 is a block diagram that illustrates a dynamic capping system, according to an implementation.

FIG. 1 is a schematic diagram that illustrates an example dynamic capping system 100. The dynamic capping system 100 can be embodied, for example, on one or more computing devices. The dynamic capping system 100 can include, for example, one or more computing devices 105, and one or more clients 190. Computing device 105 may be, for example an IBM zSeries® mainframe computer. (zSeries is a registered trademark of the IBM Corporation) or another mainframe or computing device where processing usage is tracked and billed. Thus, as used herein for ease of explanation a mainframe is any computing device where processing time is tracked and billed. Because of their large size and processing power, mainframe owners often contract out use of processing time to one or more customers. The use of processing time is often tracked and customers are billed based on their processor usage. Customers may be different departments within an organization, unaffiliated organizations, or some combination of these. In some implementations, computing device 105 may represent multiple distributed mainframe computers. For example, the system 100 may include multiple mainframe computers in communication with each other via one or more networks (not shown in FIG. 1).

The computing device 105 can include one or more processors (CPUs) or banks of processors capable of executing one or more machine executable instructions or pieces of software, firmware, or a combination thereof. The processors in a mainframe may include a plurality of processors. The plurality of processors may be managed as one or more central processor complexes. A central processor complex includes physical CPU hardware that is managed as a group. The computing device 105 may also include one or more computer readable storage devices, such as main memory, cache, or disk storage, configured to store data and/or applications, either temporarily, permanently, semi-permanently, or a combination thereof. The storage devices may include volatile memory, non-volatile memory, or a combination thereof.

The computing device 105 includes an operating system. The operating system can be the z/OS operating system or some other mainframe operating system. The operating system may include a hardware management system 144. The hardware management system 144 may define and maintain several values used to schedule and execute work on the computing device 105. For example, each customer may set a MSU limit for the work the customer runs on the billing entities of the computing device 105. These capacity limits may be recorded via the hardware management system 144. One example of a hardware management system is Processor Resource/System Manager (PRISM), which is firmware that manages the definition and resource allocation of LPARs and capacity groups. The PR/SM may be accessed via Hardware Management Console (HMC), an IBM-provided network attached console interface to PR/SM. It is understood that the hardware management system 144 thus may refer to either the hardware management system (e.g., PR/SM), or an interface for accessing the system (e.g., HMC).

A billing entity may be an LPAR or a capacity group. An LPAR is a logical segmentation of a mainframe's memory and other resources that allows the LPAR to run its own copy of an operating system and associated applications, making the LPAR, in practice, equivalent to a separate mainframe. Accordingly, processing may be billed separately for each LPAR. LPARs may be enabled via special hardware circuits or purely through software. A system administrator can assign one or more processors for the exclusive use of an LPAR. Alternately, the administrator can allow all processors to be used on some or all LPARs. LPARs may also allow multiple system images (of the same operating system or different operating systems) to run in one machine. Furthermore, each LPAR can execute one or more subsystems within an operating system. A capacity group is defined by the user and is given a collective name for use by the hardware management system 144. The customer may group two or more LPARs into a capacity group. All LPARs in a capacity group must be on the same physical machine. Processing for the capacity group may be billed separately, making a capacity group another billing entity for system 100. In some implementations, computing device 105 may represent one or more SYSPLEXes. A SYSPLEX is a collection of LPARs that cooperate to process work. The LPARs in a SYSPLEX may communicate with a specialized communications component (e.g., XCF). The LPARs in a SYSPLEX need not be located on the same physical device.

As previously indicated, the customer may set capacity limits for each billing entity. In some implementations, a capacity limit for an LPAR is referred to as a Defined Capacity or DC. In some implementations, a capacity limit for a capacity group is referred to as a Group Capacity Limit or GCL. For ease of explanation, capacity limit is used herein to refer to either a DC or a GCL. In other words, each billing entity (LPAR or capacity group) has a respective customer-defined capacity limit. The hardware management system 144 may store and maintain these limits and a workflow manager may use these limits to determine when to delay work on an LPAR.

The operating system may also include a workload manager component, such as workload managers 132 and 174. The workload manager allocates processing time and other resources to work requested by application programs. In other words, the workload manager manages the scheduling of requested work on the physical processors. The workload manager may use the capacity limit for an LPAR or capacity group to determine what work may be scheduled and whether work should be postponed due to lack of capacity. The workload manager uses a customer-defined workload service policy, e.g., stored in WLM policy files 146, to associate each request for work with a service class period and an importance level. A workload service policy describes the directives and parameters that help prioritize work in a mainframe system. The workload service policy enables the customer to assign work, e.g., batch jobs, online transactions, etc., with a service class, a service class period, an importance level, and an LPAR. The importance level is a value set by the customer and can be used by the dynamic capping system 100 in combination with low importance criteria in a dynamic capping policy to determine whether work is considered low importance work or not. The service class and service class period is used by the workload manager to determine how much processing time a work request needs.

The workload manager, such as workload manager 132 and workload manager 174, may receive requests for work that exceed the available resources (e.g., processing time). In such a scenario, the workload manager 132 may use a workload policy file, e.g. in WLM policy files 146, to allocate the resources and dispatch work according to the goals and directives indicated in the service policy within the capacity limits of each LPAR and capacity group. When LPAR's are part of a SYSPLEX, the scope of the workload manager is the SYSPLEX. In other words, one workload manager manages work on all LPARs within the SYSPLEX. Each SYSPLEX thus has its own respective workload manager. For example, in FIG. 1, LPARs 160A, 160B, . . . , and 160N may be part of a SYSPLEX and workload manager 174 manages the work on the LPARs 160. When an LPAR is not part of a SYSPLEX, the LPAR may have its own workload manager, such as workload manager 132 of LPAR 120A. A capacity group that is not part of a SYSPLEX may also have its own workload manager (not shown).

In order to optimally set the capacity limits, the dynamic capping system 100 may include an intelligent capping master 122 and one or more intelligent capping agents 170. The intelligent capping master 122 may run on one of the LPARs in the dynamic capping system 100, for example LPAR 120A. The intelligent capping master 122 may include a cap adjusting engine 126. The cap adjusting engine 126 may dynamically adjust the capacity limits of billing entities for the customer using information from the workload managers of the billing entities or SYSPLEXes that are managed by the customer. For example, the cap adjusting engine 126 may receive information from workload manager 132, workload manager 174, and a workload managers for LPARS 180A to 180N of capacity group 185. As indicated above, capacity group 180 is a collection of LPARS defined as having a collective name and a shared consumption limit. LPARS 180A to 180N may be in the same SYSPLEX or may be in different SYSPLEXes. The information provided by the workload managers may include a most recent rolling average. In some implementations, the rolling average is a 4-hour-rolling-average (4HRA). The 4HRA is a rolling average of LPAR CPU consumption in millions of service units. A service unit is a measure of CPU capacity (e.g., processing time). In an IBM mainframe environment, the service units are often measured in millions of service units (MSUs). As used herein, MSU's may refer generally to any unit used to measure and bill CPU processing time. The rolling average and the current MSU consumption may be broken down by service class, service class period, importance level, and LPAR assignment. This break-out enables the cap adjusting engine 126 to determine what percentage of work is low-importance work for each billing entity.

The cap adjusting engine 126 may use a capping policy, for example stored in capping policy files 142, to determine when and how to adjust capacity limits for billing entities. A capping policy may specify which billing entities are covered by the policy. Only those billing entities included in a policy are eligible for dynamic cap adjustment. Furthermore, if the system 100 has more than one central processor complex, there may be a capping policy for each central processor complex. Sharing of MSUs between billing entities, when possible, occurs within a dynamic capping policy. The capping policy may include an MSU cost for each billing entity. The cost may represent a relative cost of running work (e.g., MSUs) on the billing entity compared to other billing entities. The cost need not reflect actual currency amounts. For example, the cost may be on a scale from 1 to 10, 1 to 20, or whatever the customer decides. The cost may be calculated (e.g., from a prior bill) or can be supplied by the customer. The capping policy may also specify how low-importance workload is determined and how to apportion MSUs, as explained in more detail with regard to FIG. 2.

In some implementations, the information from each workload manager and the capping policy may be collected by a data collection engine 128. For example, the data collection engine 128 may query each workload manager at intervals. In some implementations, the interval may be based on how often the workload manager refreshes the rolling average. In some implementations, the interval may be a fixed period, such as one minute. The data collection engine 128 may also obtain the capacity limits for each billing entity and workload service policy information. In some implementations, the data collection engine 128 may receive this information from the workload managers. In some implementations, the data collection engine 128 may obtain the information, for example from WLM policy files 146 and/or hardware management system 144. The WLM policy file 146 may apply to a SYSPLEX or to each LPAR. The data collection engine 128 may provide the information to the cap adjusting engine 126. The cap adjusting engine 126 may use the information to determine whether any of the billing entity capacity limits can be adjusted. The adjustment may be based on a combination of the cost of an MSU on the billing entity, priority and low-importance workload or just cost and priority, depending on the implementation. The dynamic adjustment of capacity limits is described in more detail with regard to FIGS. 3-8 below. The intelligent capping master 122 may also include a base control program interface 124. The base control program interface may be an interface to a base control program 130. The base control program 130 provides authorized programs access to the hardware management system 144. The base control program 130 may thus be provided by the operating system. One example of a base control program 130 is BCPii for IBM z/OS. The intelligent capping master 122 may use base control program 130 to access and modify the capacity limits of the billing entities covered by the dynamic capacity policy.

In some implementations, the intelligent capping master 122 may generate log records, for example in history files 140. The history files 140 may include records showing how the cap adjusting engine 126 modified the capacity limits of managed billing entities over time. The history files 140 may be used to generate reports for the customer.

The dynamic capping system 100 may include one or more intelligent capping agents, such as intelligent capping agent 170. The intelligent capping agent 170 may include a data collection engine 172 similar to data collection engine 128. Thus, for example, data collection engine 172 may collect data for LPAR 160A, 160B, . . . , and 160N, and send the collected data to the intelligent capping master 122. Each LPAR in the system that is not a master may include an intelligent capping agent. Thus, for example, although LPARs 180A to 180N are in capacity group 185, each may include an instance of the intelligent capping agent that has the features of intelligent capping agent 170 discussed above. It is also understood that each LPAR in a capacity group may include a workload manager, similar to workload managers 132 and 174.

In some implementations, system 100 may include one or more clients 190. Clients 190 may include a display or monitor, a keyboard, a touchscreen, a camera, a mouse, a touchpad, a trackpad, a video processor, etc., through which a user may send data to and receive data from computing device 105. For example, client 190 may be a desktop computer, a laptop computer, a tablet computer, etc., running an intelligent capping user interface 192 that communicates with intelligent capping master 122. Thus, a customer or other user may monitor the results of using intelligent capping master 122, may set parameters used by the intelligent capping master 122, or may adjust the parameters of a dynamic capping policy via the user interface 192. The client 190 may also use other interfaces, which are not included in the scope of this disclosure, to interact with computing device 105. It is understood that client 190 may communicate with the at least one computing device 105 via a variety of networks (not shown), whether local (e.g., LAN) or distributed (e.g., the Internet).

In some implementations, computing device 105 may include one or more other hardware components not shown in FIG. 1. For example, the computing device 105 may include a channel unit for processing Input/Output (I/O) requests, a connection to another mainframe (which may be a network interface or some other communication link such as a communication bus), a tape storage unit, a telecommunications link and a disk storage device sometimes referred to as a Direct Access Storage Device (DASD). Although discussed above as using an IBM zSeries® mainframe, implementations of the system 100 are not so limited as the concepts disclosed herein can be applied to other computing environments.

FIG. 2 is an example of a user interface 200 for maintaining a dynamic capping policy, according to an implementation. The interface 200 may be generated, for example, by a dynamic capping system, such as system 100 of FIG. 1 and displayed to a customer using a client, such as client 190. In some implementations, the interface 200 may display information about a policy file, for example from capping policy files 142. The information about the policy file may include billing entities 205 covered by a specific dynamic capping policy for a customer. The policy may be identified by a name 280. The customer may set up a dynamic capping policy for each central processor complex. A central process complex includes hardware resources managed as a set by the hardware management system 144. Generally, licenses are billed on a central processor complex basis. The dynamic capping policy may be associated with a customer-specified maximum MSU limit 285. The maximum MSU limit 285 represents an upper limit of the customer's bill each month and is controlled (e.g., set) by the customer. The system optimizes this limit by favoring billing entities (e.g. LPARs or groups of LPARs) having higher-importance workload and higher business priority. The maximum MSU limit 285 is shown as a quantity, e.g., the number of MSUs. However, the maximum MSU limit can also be expressed in other manners, for example as a percent of the machine capacity. Thus it is understood that the maximum MSU limit can be expressed as a quantity of MSUs, or as criteria the system uses to calculate a quantity of MSUs. The maximum MSU limit is also referred to as the customer cap, as all work running on the dynamic capping system for the customer cannot exceed the customer cap.

The dynamic capping policy may also include an indication 290 of whether low-importance work is considered during the dynamic capping. In some implementations, the indication 290 may be "No" or "Yes". In some implementations, the indication 290 may be "No", "Combined" or "Yes". When the indication 290 is "No" the system does not use low-importance workload to decide which billing entities receive extra MSUs. Instead, the system relies on priority and deficit ratios. When the indication is "Yes" the system uses low-importance workload to determine a favored billing entity within a SYSPLEX, but does not use low-importance workload when selecting a favored billing entity between two SYSPLEXes. The optional value of "Combined" enables the system to use low-importance workload across SYSPLEXes, only using priority when there is a tie between two billing entities with the same low-importance workload percentage.

The dynamic capping policy may identify two or more billing entities 205. The billing entities 205 may be listed by name, e.g., the name of the LPAR or capacity group. Any dynamic adjustment of capacity limits occurs between the billing entities 205 identified in the policy. The user interface 200 may include an indication 210 of which type of billing entity the name represents. For example, in some implementations, an LPAR is identified by an 'L' in and a capacity group by a 'G' for indication 210. The user interface 200 may include an indication of the proportion 215 of the maximum MSU limit. The proportion represents the portion of the maximum MSU limit 285 the billing entity is entitled to. The billing entities need not share the MSUs equally. For example, if a first billing entity runs high importance work or runs a high-transaction work, the customer may decide that it is entitled to more MSUs than other billing entities.

Thus, for example, SJTEST2 in user interface 200 has a proportion of 555, so SJTEST2 is entitled to more than half of the allotted customer processing time (e.g., 555 is slightly more than half of 1006, which is the sum of all proportions in the policy). In contrast, IMSA and SJSC are each entitled to about 5% of the maximum MSUs (e.g., 59/1006 and 52/1006 respectively). Expressing the proportion in this manner allows the customer to modify the maximum MSU limit 285 without having to re-set or re-calculate the MSU entitlement of each billing entity.

The interface 200 may also display the MSU entitlement 220 value of each billing entity. The entitlement is expressed in MSUs and is calculated based on the proportion, total of all proportions for the policy, and the maximum MSU limit 285. For example, if the customer set a maximum MSU limit 285 for the policy at 400 MSUs, the system may calculate the entitlement by dividing the proportion for the billing entity (e.g., 555) by the total proportion (1006) and multiplying the result by the limit 285 (e.g., 400), which provides the service unit entitlement value (e.g., 555/1006*400=222) for the billing entity. The entitlement represents the maximum rolling average that a billing entity is entitled to, e.g., the number of MSUs that a billing entity may have as a rolling average without having to share MSUs. In other words, if the billing entity is running (e.g., expressed as a 4HRA) under its entitlement, the billing entity has spare MSUs to lend to other billing entities, but a billing entity running over its entitlement has to borrow MSUs above its entitlement from another billing entity, if there are any to borrow. The dynamic capping policy may not actually store the entitlement 220 for each billing entity. Instead, the system may calculate the entitlement for each billing entity as it is needed.

The interface 200 may also include the MSU cost 221 of each billing entity. The MSU cost may be provided by the customer or may be calculated by the system. The MSU cost represents a relative cost of running work on the billing entity and does not need to reflect an actual dollar amount. Thus, for example, the MSU cost of SJTEST2 is 20 and DB2GROUP is 10, meaning it costs about twice as much to run work on SJTEST2 as DB2GROUP. In some implementations, the system may calculate the MSU cost based on previous bills or a cost reporting software product, such as BMC Cost Analyzer for zEnterprise. The interface 200 may also display the cost entitlement 223 for each billing entity. The cost entitlement 223 reflects the entitlement 220 of the billing entity multiplied by the MSU cost 221. The sum of the cost entitlement 223 for each billing entity 205 covered by the policy represents the cost limit 295 for the system. Thus, the cost limit is calculated from the MSU cost 221 for each billing entity and the entitlement for each billing entity. The cost limit 295 represents a maximum cost limit for the policy, and the sharing of work between billing entities may not go over this limit. The cost limit and cost entitlements ensure that the system does not increase costs by moving too many MSUs from inexpensive billing entities to expensive billing entities.

The interface 200 may also display the priority 225 of each billing entity. The priority is assigned by the customer to each billing entity in the dynamic capping policy and represents the importance of the billing entity. The dynamic capping system 100 may consider the priority and cost entitlement of each billing entity when determining which billing entities can receive additional MSUs, as explained below. The interface 200 may also display the low-importance workload percentage 230 calculated for each billing entity. The low-importance workload percentage 230 reflects the percentage of standard CPU consumption of work with service class periods having low importance over the consumption of all service class periods over the last five minutes. Low-importance work may be determined based on the importance criteria identified in the dynamic capping policy. In one example, the importance criteria may specify which importance levels are considered low importance. The importance level of work is assigned to the service class and service period, for example in the WLM policy. For example, the WLM policy may indicate a particular service class has one of a number of importance levels, regardless of the service period. As another example, the WLM policy may specify a different importance level for certain service periods of a service class. For example, some service classes may include multiple periods, and when an entity (address space) uses a threshold number of MSUs the system will drop the period for the entity, e.g., dropping from period 1 to period 2, and later from period 2 to 3, etc. The WLM policy may specify a different importance level for each of the periods. The importance criteria in the dynamic capping policy may determine which of the importance levels are considered low importance. The dynamic capping policy may include importance criteria by SYSPLEX. Thus, for example, importance levels of 5 and higher may be low-importance on a first SYSPLEX while importance levels of 3 or higher may be low-importance on a second SYSPLEX. While the importance criteria above uses importance levels, it is understood that the importance criteria could use service class or a combination of service class and service class period, or an equivalent. In some implementations using IBM mainframes, the low-importance work percentage is calculated from the answer area of the MVS service IWM-RCOLL. In some implementations using an IBM mainframe, the low-importance work percentage is calculated from the Service Management Facility type 72-3 records. The Service Management Facility records and stores both system-generated and application-generated activity records, which may subsequently be read and processed for many purposes.

The interface 200 may also display the adjusted low-importance workload percentage 235. The adjusted low-importance workload percentage 235 may represent a priority-based adjustment of the low-importance workload percentage 230. For example, the dynamic capping billing policy may indicate a customer-assigned priority 225 for each billing entity. The priority may be associated with a corresponding adjustment factor, where higher priority is associated with a lower adjustment factor. For example, a system may have priorities ranging from 1 to 5, with 1 being the highest priority. The respective adjustment factors may be 0.6, 0.8, 1, 1.2, and 1.4, where the highest priority has the adjustment factor of 0.6 and the lowest priority has the adjustment factor of 1.4. In practice, the adjustment factors favor higher-priority billing entities, making may make it appear as though the high-priority billing entity has less low-importance work than actually calculated. Of course, the priorities and adjustment factors given above are exemplary in number and values and implementations are not limited to the numbers and values illustrated. The adjustment factor assigned to each priority may be set and adjusted by the customer. The quantity and values of the priorities may also be assigned by the customer.

The interface 200 may also include a rolling average 240 for each billing entity. The rolling average 240 is obtained from a workload manager and represents a rolling average of CPU consumption in e.g., MSUs for the billing entity. Although a four-hour rolling average (4HRA) is used in this example, it is understood that another time period (e.g., six-hour rolling average, etc.) may be used, depending on the implementation. The time period will generally be orders of magnitude larger (hours) than the interval at which the capacity limits are adjusted (e.g., minutes). Because the rolling average covers an extended time, the rolling average changes gradually and may be used to dynamically adjust the capacity limits of the billing entities. In some implementations, the workload manager refreshes the rolling average at regular intervals, for example every 10 seconds or every minute. In some implementations, the dynamic capping system can mirror this interval by adjusting (when needed) capacity limits using the same interval. Thus, for example, when the workload manager refreshes the rolling average the system may obtain the refreshed rolling average and determine whether capacity limits should be adjusted. In some implementations, the dynamic capping system may adjust the capacity limits at a different interval. For example, the workload manager may refresh rolling averages several times a minute, but the dynamic capping system may adjust the capacity limits every minute. The user interface 200 may also include the current capacity limit 245 for each billing entity. The capacity limit 245 represents the maximum number of MSUs the billing entity has access to and is used by the workload manager to decide whether any work needs to be deferred or elongated to meet the capacity limit. In some implementations, the capacity limits represents either a defined capacity (for an LPAR) or group capacity limit (for a capacity group), depending on the type of billing entity. The example interface 200 may also include other information not illustrated in FIG. 2. For example, the user interface 200 may use historical records, such as history files 140, to show, for each billing entity, the lowest value for the capacity limits in the most recent period (e.g., 4 hours, 6 hours, 12, hours etc.), the highest value for the capacity limits in the most recent period, the lowest rolling average or highest rolling average in the most recent period, etc. Such historical records may allow the customer to determine whether to adjust the parameters of the dynamic capping policy, such as the proportions or the priority level of any particular billing entity.

Figure 3:
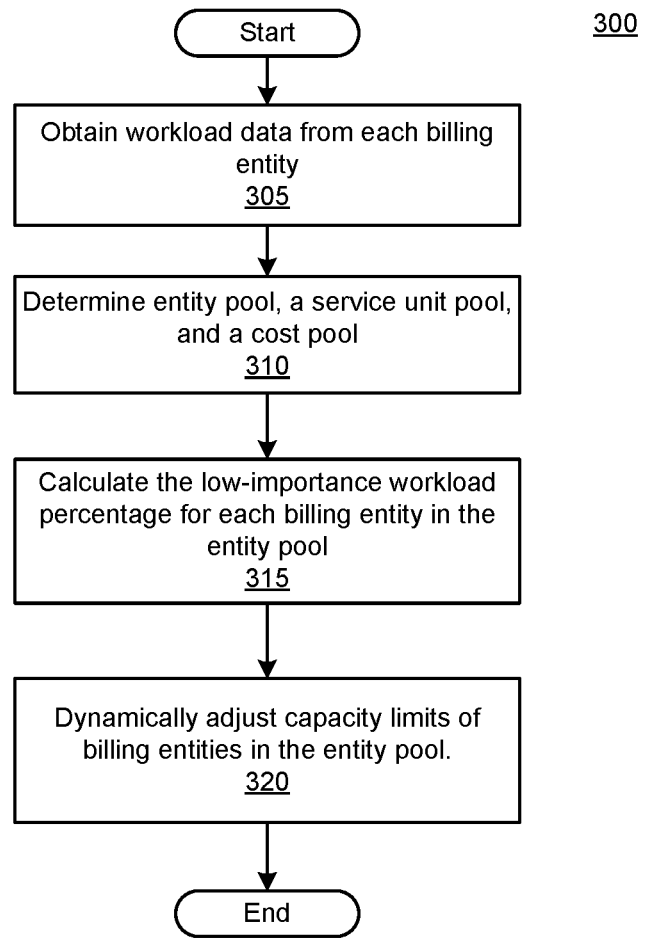
FIG. 3 is a flowchart illustrating an example process for dynamically adjusting consumption limits across billing entities for a customer while accounting for billing entity cost differences, according to an implementation.

FIG. 3 is a flowchart illustrating an example process 300 for dynamically adjusting consumption limits across billing entities for a customer while accounting for billing entity cost differences, according to an implementation. Process 300 may be run at regular intervals by an intelligent capping master of a dynamic capping system, such as system 100 of FIG. 1. For example, if the workload manager refreshes the rolling average at least once (but possibly several times) every minute, the system may run process 300 every minute. It is understood that process 300 operates under one dynamic capping policy (e.g., for billing entities identified in the capping policy). It is understood that a dynamic capping system may have more than one policy in place, for example when the customer has access to more than one central processor complex. It is therefore understood that the system may perform process 300 for each currently active dynamic capping policy.

Process 300 may begin with receiving workload data from each billing entity (305) identified in the dynamic capping policy. The workload data may include a rolling average (e.g., four-hour rolling average) for each LPAR or capacity group specified in the capping policy. If the billing entity is a capacity group, the workload manager may provide the rolling average for the group, or the system may add the rolling average of each LPAR in the group to arrive at the rolling average for the group. It is understood that in some implementations the workload data may come from more than one workload manager. For example, a dynamic capping policy may cover LPARs and capacity groups from different SYSPLEXes, where the scope of a workload manager extends to one SYSPLEX. In this case, the system may query multiple workload managers to obtain the workload data. In some implementations, the work load data (e.g., the rolling average) may be provided by importance level and, within importance level, by service class and service class period. In other words, the workload data may include information that allows the system to obtain a rolling average by importance level. The dynamic capping policy may include importance criteria that specifies how to determine low importance work. For example, the dynamic capping policy may specify which importance levels are considered low-importance or an importance level at which workload begins to be considered low importance. The system may and use this information to determine a low-importance workload percentage for a billing entity as described in more detail herein.

The system may then determine the entity pool, the service unit pool, and the cost pool (310). The entity pool represents the billing entities that have a rolling average that exceeds the billing entity's MSU entitlement value. Thus, the billing entities in the entity pool are looking for additional MSUs to borrow. The service unit pool represents extra MSU capacity from entities that have not reached their MSU entitlement values. In other words, if the rolling average for a billing entity is under the MSU entitlement value for the billing entity, the billing entity can share excess MSUs with another entity. The service unit pool represents the excess MSUs of all such billing entities covered by the dynamic capping policy. The cost pool represents the cost limit for the service unit pool. In other words, the cost pool may represent the MSU cost for the extra MSUs. As each billing entity may have a different MSU cost, some of the extra MSUs have a higher cost than others. When a billing entity has extra MSUs, the billing entity may contribute the MSU cost multiplied by the excess MSUs to the cost pool. Determination of the entity pool, service unit pool, and cost pool is described in more detail with regard to FIG. 4. If there are no entities in the entity pool, process 300 may end as there is no need to adjust any capacity limits. In some implementations, the system may set the billing entity capacity limit to the entitlement value for the billing entity, if needed, when there are no entities in the entity pool. It is understood that the entitlement value and MSU cost for the billing entity may be stored in the policy or may be calculated from other data items stored in the policy, as discussed above with regard to FIG. 2.

The system may also calculate the low-importance workload percentage for each billing entity in the entity pool (315). In some implementations, for example when low-importance workload is not considered in dynamic capacity limit adjustment, this step may be optional, or the system may automatically set the low-importance workload percentage to 0%. In some implementations, the system may calculate the low importance work using IWMRCOLL data from the workload manager. For example, the system may include a table entry for each service class period that contains the number of MSUs consumed by that service class period, and an importance level for the service class period. As the system scans the table it may accumulate the MSUs used by importance. The system may calculate the low importance work percentage by dividing the MSUs considered low importance (e.g., as specified in the WLM policy) by the total MSUs for the billing entity. The calculation of low-importance workload percentages is described in more detail with regard to FIG. 8. The system may use the workload information, low-importance workload percentages, and capping policy to adjust the capacity limits of billing entities in the entity pool (320). Details for adjusting the limits are explained in more detail below with regard to FIG. 5. Process 300 then ends, having intelligently set capacity limits so that important workload can execute, when possible, at the expense of lower-importance work.

Figure 4:
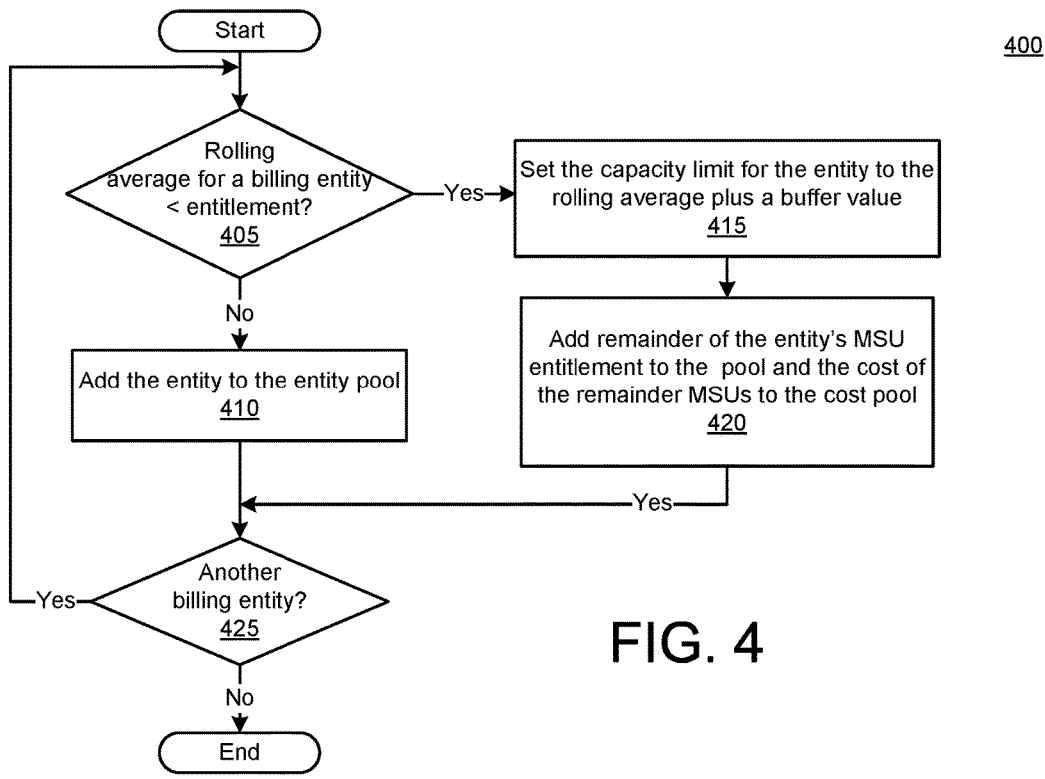
FIG. 4 is a flowchart illustrating an example process for determining billing entities in an entity pool, according to an implementation.

FIG. 4 is a flowchart illustrating an example process 400 for determining an entity pool, a service unit pool, and a cost pool, according to an implementation. An entity pool is one or more billing entities with a rolling average (e.g., 4HRA) that exceeds the entitlement of the billing entity. The service unit pool includes MSUs that billing entities not in the entity pool have to share. The cost pool represents the cost of the MSUs in the service unit pool. Process 400 may be run as part of step 310 of FIG. 3. Process 400 may begin with an empty entity pool, an empty service unit pool (e.g., zero MSUs in the pool), and empty cost pool (and zero cost), and selection of a first billing entity in the dynamic capping policy. The system may determine whether the rolling average, as reported from a workload manager, for the selected billing entity is less than the entitlement value for the billing entity (405). As explained above, the dynamic capping policy may specify an MSU entitlement value for each billing entity identified in the policy, either directly or as a calculation of proportion and the maximum MSU limit specified in the policy. When the rolling average is not less than the entitlement value (405, No), the billing entity is added to the entity pool (410). Billing entities with a rolling average equal to the entitlement value may be skipped (not shown), as they have no MSUs to give and do not need to borrow any.

When the rolling average is less than the entitlement (405, Yes), the billing entity has MSUs to share. In some implementations, the system may set the capacity limit for the billing entity to a value that is equal to the rolling average plus a buffer value (415). Because the rolling average is an average of a fairly long period of time compared with the refresh interval, the rolling average does not move quickly. Thus, the buffer value allows the billing entity to have a few additional MSUs (e.g., 2 or 3 MSUs) for its capacity limit in the event the rolling average does start to increase. This is one example of dynamically adjusting the capacity limit, so that unused capacity can be shared with billing entities that may need the extra capacity. In some implementations, the system may not adjust the capacity limit but may calculate the number of MSUs the billing entity has to spare. For example, subtracting the rolling average and buffer from the entitlement value for the billing entity.

The system may put the unused MSUs of the MSU entitlement for the billing entity (e.g., those the billing unit can share) in the service unit pool (420). In other words, the difference between the MSU entitlement value for the billing entity and the rolling average plus the buffer may be added to the service unit pool. For example, if a billing entity is entitled to 75 MSUs but has a rolling average of 50 MSUs, the system may add 23 MSUs to the service unit pool (75−(50+2)), where the buffer is 2 MSUs. The system may also determine the cost of the unused MSUs and add that cost to the cost pool. For example, if the MSU cost of the 23 MSUs added to the service pool is 10 (e.g., an MSU cost of 10), the system may add 230 to the cost pool (10×23).

The system may repeat steps 405 to 420 for each billing entity identified in the dynamic capping policy (425, Yes). When all billing entities have been added to the entity pool or contributed to the service unit pool and cost pool (425, No), process 400 ends. At the end of process 400, the entity pool includes billing entities that need more MSUs than they are entitled to and a pool of service units and cost pool from which these entities can borrow.

An alternate method of determining the service unit pool and the cost pool may be to set the capacity limit as described above in step 415 and set the capacity limit of any entity in the entity pool to the entitlement value for the entity in step 410. Once the capacity limit for all billing entities have been determined, the system may set the service unit pool equal to the sum of the capacity limits for the billing entities in the dynamic capping policy subtracted from the MSU limit for the dynamic capping policy. The system may then set the cost pool to the sum of the product of the capacity limits and the MSU cost for each billing entity subtracted from the cost limit for the policy. In other words the service unit pool=MSU limit−$\Sigma_{i=1}^{n}$ capacity_limit (i) where n is the number of billing entities in the capping policy, and the cost pool=cost limit−$\Sigma_{i=1}^{n}$ capacity$_{limit}$(i) MSU_cost(i).

Figure 5:
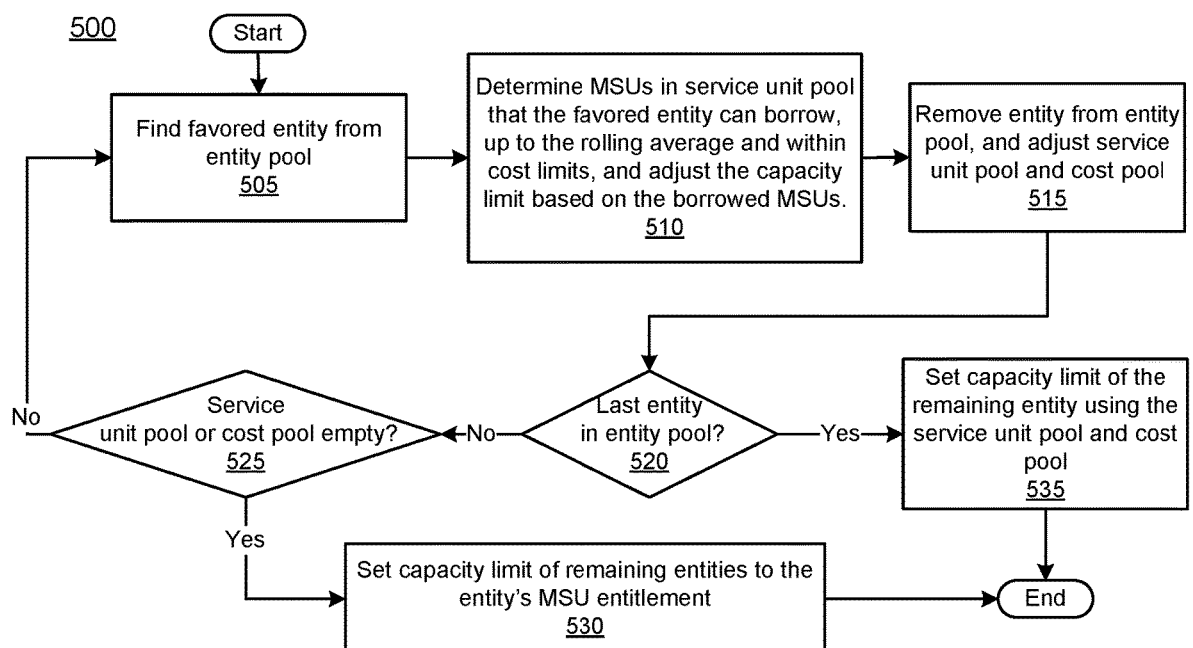
FIG. 5 is a flowchart illustrating an example process for adjusting capacity limits for billing entities in the entity pool while accounting for billing entity cost differences, according to an implementation.

FIG. 5 is a flowchart illustrating an example process 500 for adjusting capacity limits for billing entities in the entity pool while accounting for billing entity cost differences, according to an implementation. Process 500 intelligently distributes the MSUs in the service unit pool to entities in the entity pool favoring billing entities with more important workloads, based on amount and priority, while staying under an overall cost. Staying under an overall cost prevents an expensive billing entity from receiving too many additional MSUs from an inexpensive billing entity, which could drive up the overall costs. When a dynamic capping policy covers billing entities in more than one SYSPLEX, the MSUs/costs are shared across SYSPLEXes, even though the scope of the workload manager does not extend across a SYSPLEX. Thus, the dynamic capping system is able to optimize the sharing of MSUs use across multiple SYSPLEXes. Process 500 may be executed as part of step 320 of FIG. 3.

Process 500 begins by finding the favored billing entity from the entity pool (505). Which billing entity is favored depends on the dynamic capping policy and the attributes of the billing entities in the billing pool. For example, the dynamic capping policy may or may not use low-importance workload percentages to determine favored entities. The dynamic capping policy may include an indication of whether low-importance workload is considered, for example by use of a parameter. In addition to low-importance workload, the system may use priorities assigned to each billing entity to determine which entities are favored. The priorities may be assigned in the dynamic capping policy, as discussed with regard to FIG. 2. Finally, a deficit ratio based on entitlement may also be considered. Determining which entity is favored is discussed below with regard to FIGS. 6 and 7.

The system may adjust the capacity limit of the favored entity using the service unit pool and cost pool (510). For example, the system may find the difference between the rolling average for the favored entity and the entitlement value of the favored entity (e.g., 4HRA−entitlement). This represents the quantity of MSUs the favored entity wants to borrow. If the service unit pool does not have that quantity, the system reduces the borrowed MSUs to the number of MSUs remaining in the service unit pool. This is one method of bounding the borrowed MSUs by the available pool of service units.

In some implementations, the system may calculate how many of the remaining MSUs in the service unit pool the favored entity is entitled to. For example, when the favored entity has the same priority as another entity in the entity pool, the system may ensure that the other entity receives some of the MSUs left in the service unit pool. For example, the system may use the following formula (MSUs in service unit pool×entitlement value of favored entity)÷(total entitlement of entities in the entity pool) to calculate the number of MSUs to give to the favored entity. Thus, for example, if the service unit pool includes 8 MSUs, the favored entity has an entitlement of 50 MSUs and another entity in the pool has an entitlement of 30 MSUs, the system may calculate that the favored entity can have 5 of the 8 MSUs in the service unit pool. The system may set the borrowed MSUs to the smaller of this calculated number (e.g., the portion of the service unit pool the entity is entitled to) and the difference between the rolling average and the entitlement for the favored entity. Thus, the borrowed MSUs (to this point) represent at least what it wants to borrow up to the calculated service unit pool portion. This is another way the borrowed MSUs are bounded by the available pool of service units.

The system may further reduce the borrowed MSUs to ensure the borrowed units stay within the established cost limits. In other words, the borrowed MSUs may be bounded by the available cost pool in addition to the available pool of service units. Accordingly, the system may determine whether the cost pool supports moving the borrowed MSUs to the favored entity. The system may take the MSU cost for the favored billing entity and multiply the MSU cost by the borrowed MSUs, giving a borrowed cost. If the borrowed cost is less than or equal to the cost pool, the system can allow the favored billing entity to have the borrowed MSUs. If not, the system may further reduce the borrowed MSUs until the borrowed cost is at or below the cost pool.

For example, if the service unit pool has 55 MSUs, and the cost pool is 4500 and the favored entity wants to borrow 50 MSUs, the system determines whether or not the favored entity can borrow the 50 MSUs. If the MSU cost for the favored entity (i.e., from the capping policy) is 100, the system may determine that borrowing 50 MSUs would exceed the cost limit represented by the cost pool (because 50×100 is greater than 4500) and may limit the borrowed MSUs to 45. In this case, the system may set the capacity limit of the favored entity to 45 MSUs plus the entitlement value. If the cost pool were 6000 or if the cost per unit for the favored entity were 50 and not 100, the system may keep the borrowed MSUs at 50 MSUs and may adjust the capacity limit of the favored entity to 50 MSUs plus the entitlement value for the favored entity. It is possible that the cost pool does not support moving any MSUs to the favored entity. In this case, the system may set the capacity limit for the favored entity to the entitlement, remove the favored entity from the entity pool, and proceed to step 520.

Once the system has determined the borrowed MSUs bounded by the service unit pool and cost pool, the system may adjust the capacity limit for the favored entity using the borrowed MSUs. For example, the system may set the capacity limit to the sum of the borrowed MSUs and the entitlement of the favored entity. The system may then subtract the borrowed MSUs from the service unit pool and subtract the borrowed cost from the cost pool (515). After adjusting the capacity limit of the favored entity, the system also removes the favored entity from the entity pool.

If the entity pool has only one entity remaining (520, Yes), the system may determine the borrowed MSUs for the remaining entity (535). Similar to step 510, the system may first set the borrowed MSUs for the remaining entity to any remaining MSUs capped by the rolling average (i.e., no more than the rolling average). The system may then determine whether to further reduce the borrowed MSUs based on the cost pool, as described above. The system may then set the capacity limit to the sum of the borrowed MSUs (if any) and the entitlement for the entity. Process 500 then finishes, having distributed MSUs to the entities wishing to borrow additional MSUs.

If the entity pool has more than one entity left (520, No), the system may determine whether either of the service unit pool and the cost pool are empty (525). If both pools are not empty (525, No), the system can continue to distribute MSUs to billing entities in the entity pool by finding the favored entity of the entities remaining in the entity pool (505) and repeating steps 510 to 520 for this next favored entity. If the service unit pool is empty or the cost pool is empty (525, Yes), the system may set the capacity limit of all entities remaining in the entity pool to their respective MSU entitlement values (530). Process 500 then ends. In this manner, the system provides extra MSUs to favored billing entities (e.g., LPARs or capacity groups) ahead of non-favored entities, ensuring maximum high importance throughput for the lowest possible cost, e.g., represented by the maximum MSU limit and the cost limit set by the customer in the dynamic capping policy.

Figure 6:
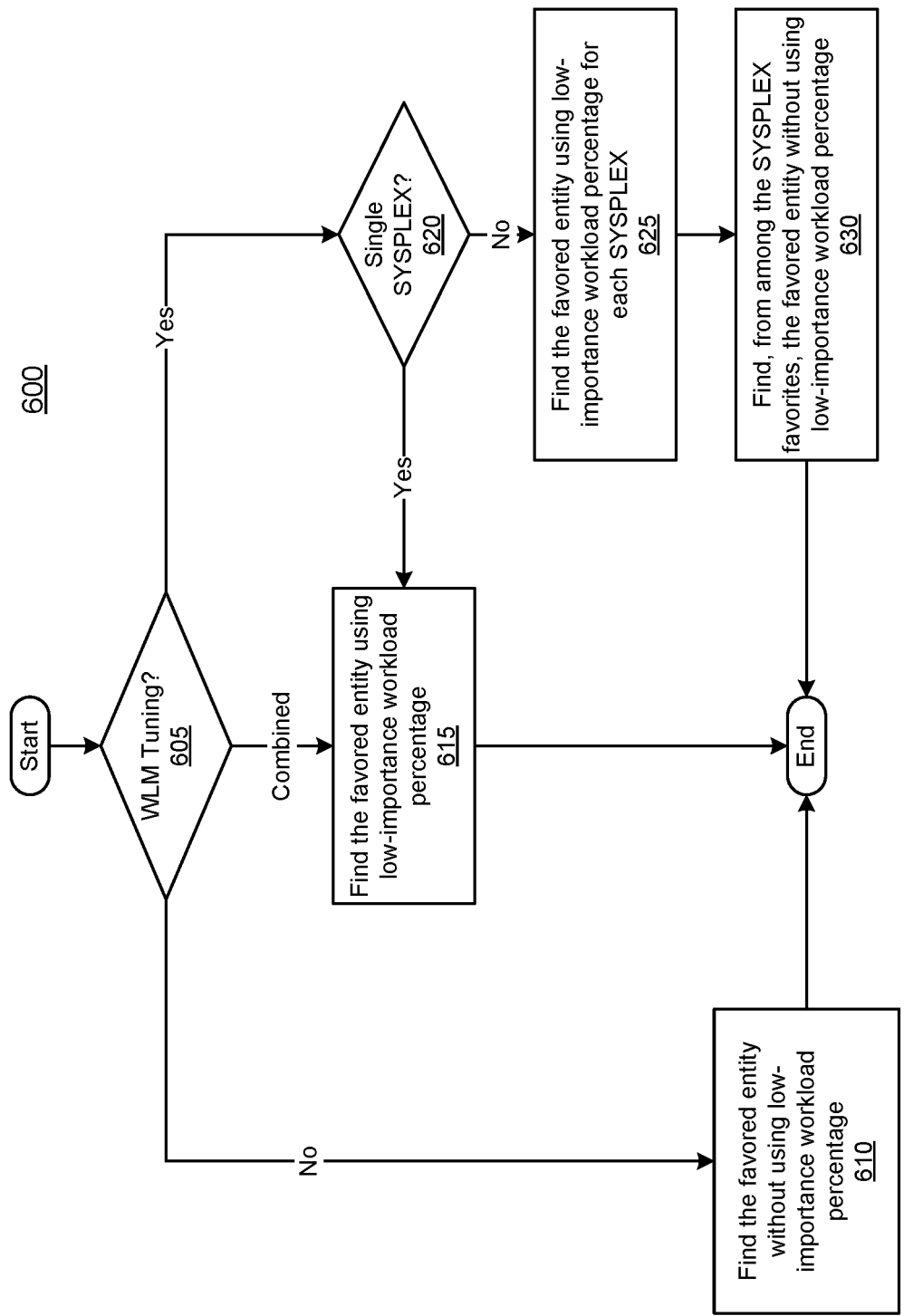
FIG. 6 is a flowchart illustrating an example process for determining which entities in the entity pool are eligible for favored entity status, according to an implementation.

FIG. 6 is a flowchart illustrating an example process 600 for determining which entities in the entity pool are eligible for favored entity status, according to an implementation. Process 600 may be executed as part of step 505 of FIG. 5. Process 600 decides, based on parameters from the dynamic capping policy, which factors are considered in determining which billing entity is favored. Process 600 begins by deciding how low-importance workload is to be considered (605). Low-importance workload may be ignored (605, No), may be used across different SYSPLEXes (605, Combined), or may be considered within a SYSPLEX but not across SYSPLEXes (605, Yes). Low-importance workload may be ignored (605, No) when the dynamic capping policy includes one or more mission-critical LPARs or capacity groups. In such as situation, those mission-critical billing entities should always be favored, regardless of whether they are running low-importance work or not. Thus, the system may find the favored entity in the entity pool without using low-importance workload percentages (610), As described in more detail with regard to FIG. 7. This may be done across multiple SYSPLEXes, if the dynamic capping policy includes multiple SYSPLEXes. In some implementations, the system may set the low-importance workload percentage to 0% for all billing entities when low-importance workload is not to be considered and find the favored entity as described with regard to step 615. In such an implementation, the system may in effect default to using priority, as described in FIG. 7, since there is a tie between all billing entities for low-importance workload percentages (i.e., they all have the same workload percentage, so priority is used to select a favorite).

Low-importance workload may be used across different SYSPLEXes (605, Combined) when the SYSPLEXes have similar workload management policies. Workload management policies are similar when the importance values assigned to service class periods are similar. In other words, because the system uses the importance value to determine whether work is low-importance or not, these values must be similar or the comparison does not provide an accurate picture. When they are similar, the system may find the favored entity in the entity pool using low-importance workload percentages (615).

Because it is possible for each SYSPLEX to have a unique workload management policy, it is possible that the importance values are not similar. In such a situation, low-importance workload may be considered within a SYSPLEX (605, Yes) but not between SYSPLEXes. Accordingly, the system may determine whether the billing entities in the entity pool are from the same SYSPLEX or not (620). If they are all from the same SYSPLEX (620, Yes), the system may find the favored entity from the entity pool using low-importance workload percentage (615). If two or more SYSPLEXes are represented in the entity pool (620, No), the system may find a favored entity within each SYSPLEX using low-importance workload percentage (625). Thus, the result of step 625 is one favored entity per SYSPLEX. The system may then select a favored entity from among the SYSPLEX-favored entities without considering low-importance workload (630). In effect this allows the system to find a most favored candidates within each SYSPLEX and select among the favored candidates without consideration of low-workload percentages. Process 600 then ends, having selected one favored billing entity from among the entities remaining in the entity pool.

Figure 7:
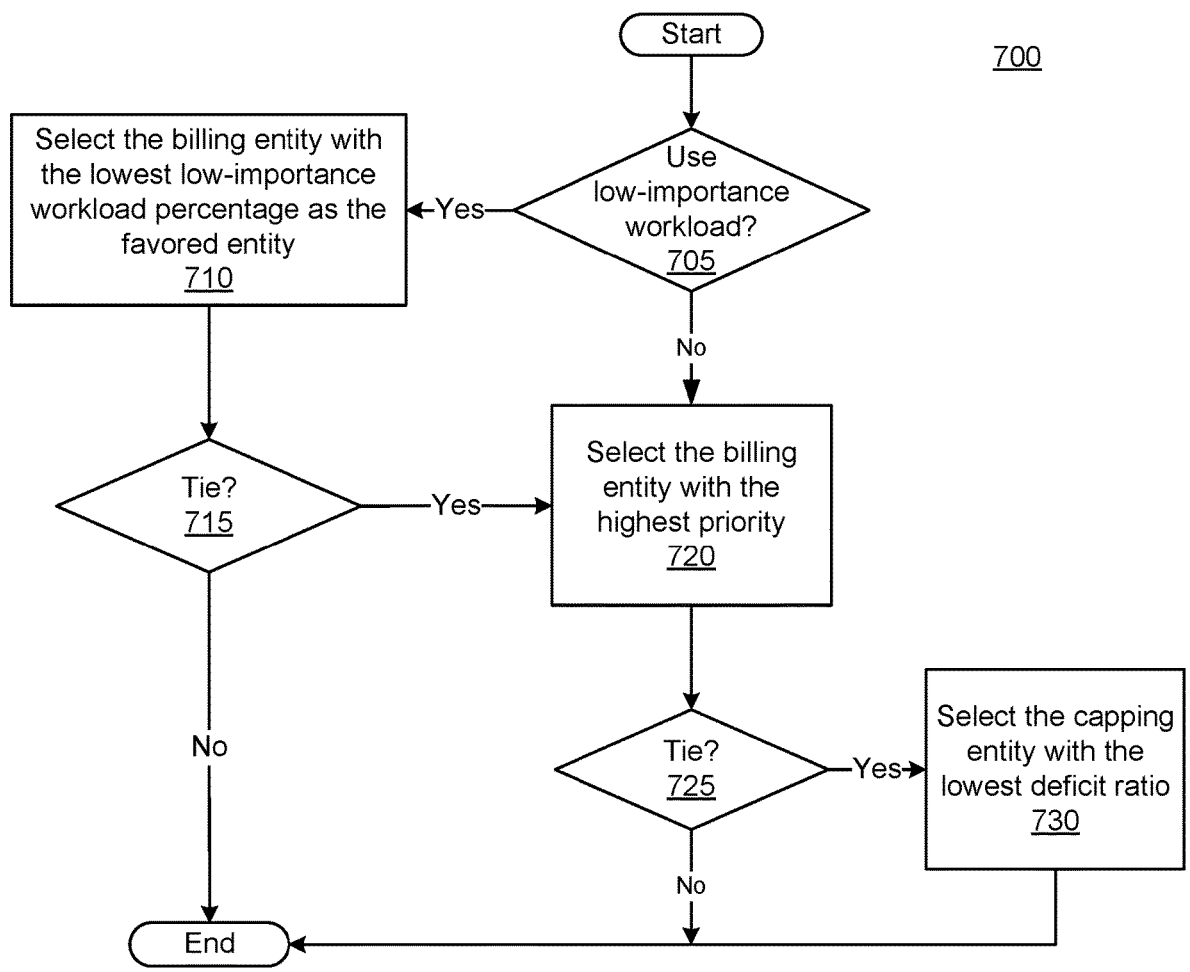
FIG. 7 is a flowchart illustrating an example process for determining a favored entity from those eligible for favored entity status, according to an implementation.

FIG. 7 is a flowchart illustrating an example process 700 for determining a favored entity from those eligible for favored entity status, according to an implementation. Process 700 may be executed as part of steps 610, 615, 625, and 630 of FIG. 6. Process 700 demonstrates how a favored entity is selected from among candidate entities either using low-importance workload, or without using low-importance workload. In steps 610 and 615 the candidate entities are the entities in the entity pool. In step 625 the candidate entities are entities in the entity pool that belong to the same SYSPLEX. In step 630, the candidate entities are the favored candidates from each SYSPLEX (e.g., those identified as part of step 625).

Process 700 may begin by determining whether to consider low-importance workload (705). If low-importance workload is considered (705, Yes), the system may select the billing entity from the candidate entities that has the lowest low-importance workload percentage as the favored entity (710). This in effect favors billing entities that have high-importance work. In some implementations, the system may use the adjusted low-importance workload percentage, or in other words may use an adjustment factor that is based on a priority assigned to each billing entity. If only one candidate entity has a lowest low-importance workload percentage (715, No), process 700 ends, having selected a favored entity.

If two or more candidate entities have the same lowest low-importance workload percentage (715, Yes) or if low-importance work is not to be considered (705, No), the system may select the candidate entity with the highest priority (720). If two candidate entities were tied (715, Yes), one of the two with the highest priority is selected. If low-importance work is not to be considered (705, No) the billing entity with the highest priority is selected from among the candidate entities. The priority may be assigned to each LPAR by the customer as part of the dynamic capping policy. Thus, the customer may adjust the effects of the policy by changing the priorities assigned to the billing entities in the dynamic capping policy. If only one entity has the highest priority (725, No), process 700 ends, having selected a favored entity.

If two candidate entities have the same priority (725, Yes), the system may use a deficit ratio to select a favored entity from among the entities with the same highest priority (730). A deficit ratio is the ratio between the rolling average and the entitlement for a billing entity. For example, if the rolling average for the billing entity is 40 MSUs and the entitlement is 30 MSUs, the deficit ratio is 4/3 or 1.33. Thus, the higher the deficit ratio, the more MSUs the billing entity wants to borrow. The system may select, from the entities with the same priority, the one with the lowest deficit ratio as the favored entity. Process 700 then ends, having selected the favored entity.

Figure 8:
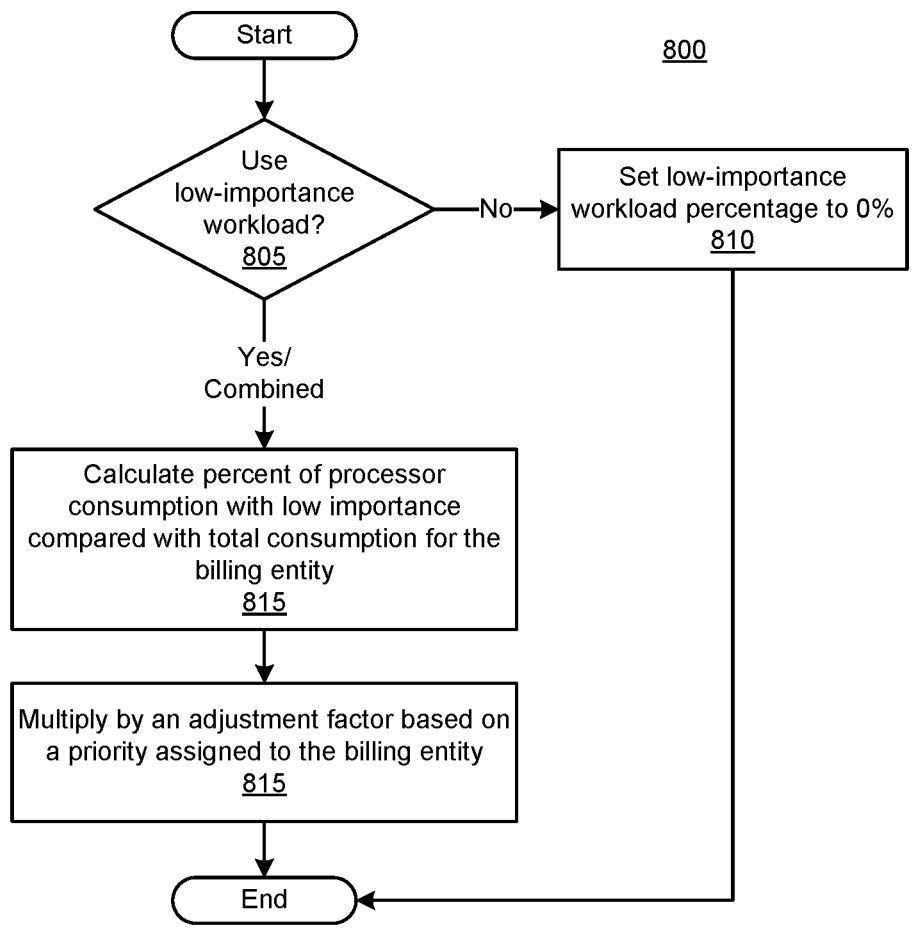
FIG. 8 is a flowchart illustrating an example process for calculating low-importance workload for a billing entity, according to an implementation.

FIG. 8 is a flowchart illustrating an example process 800 for calculating low-importance workload for a billing entity, according to an implementation. Process 800 may be performed as part of step 315 of FIG. 3. It is understood that process 800 is described as calculating the low-importance workload percentage for one billing entity, it is understood that as part of step 315, the system may repeat process 800 for each billing entity in the entity pool, or for each billing entity in the dynamic capping policy, as appropriate.

In some implementations, process 800 may determine whether the dynamic capping policy uses low-importance workload (805). If it does not (805, No), the system may set the low-importance workload percentage to zero percent (810). In some implementations, process 800 is optional when the dynamic capping policy does not use low-importance workload. In other words, the system may skip process 800 because process 600 accounts for not using low-importance workload, as described above with regard to step 610. If low-importance workload is considered (805, Yes/Combined), the system may calculate the percent of processor consumption with low importance compared with the total processor consumption (815). In some implementations, the workload data may include a break-down of processor usage by importance level. In some implementations, the system may calculate the low importance work using IWMRCOLL data from the workload manager. For example, the system may include a table entry for each service class period that contains the number of MSUs consumed by that service class period and an importance level for the service class period. As the system scans the table it may accumulate the MSUs used by importance level. The dynamic capping policy may include importance criteria that indicate which importance levels are considered low-importance. In some implementations, where a low value importance level (e.g., 1) is high importance, the dynamic capping policy may specify the highest importance level that is considered low-importance. Thus, for example, if the dynamic capping policy specifies 4, any importance level of 4 or below may be considered low-importance. In general, the importance criteria of the dynamic capping policy includes information from which the system can decide which work is low importance and which work is not. The system may calculate the low importance work by dividing the MSUs considered low importance, based on the WLM policy, by the total MSUs used on the LPAR. In some implementations, the system may use SMF type 72 records from IMB's RMF or BMC Solftware's CMF MONITOR, which provide similar information. If the dynamic capping policy includes two SYSPLEXes with differing workload service policies, the dynamic capping policy may include low-importance workload criteria for each SYSPLEX. This is because the meaning of importance levels may differ between the two SYSPLEXes. The system may use the importance criteria to determine what work was low-importance and what work was not, and calculate the percentage that was low-importance. A lower percentage indicates that the billing entity does more high-importance work.

In some implementations, the system may multiply the low-importance work percentage by an adjustment factor that is related to the priority of the billing entity (815). As discussed above with regard to FIG. 2, the dynamic capping policy may specify the priority of each billing entity and may also assign an adjustment factor to each priority. Higher priorities have lower adjustment factors. Thus, billing entities with high priority may appear to have less low-importance work, while billing entities with low priority may appear to have higher low-importance work. The adjustment factor is another tool the customer can use to control the effect of the dynamic capping policy. Of course, step 815 is optional and the low-importance workload percentage need not be adjusted. Process 800 then ends.

According to one implementation, a mainframe computing system includes a central processor complex, a plurality of billing entities, a billing entity being a logical partition of the mainframe computing system or a group of logical partitions, each billing entity having a respective capacity limit, and a workload manager that schedules work requested by the plurality of billing entities on the central processor complex and tracks, by billing entity, a rolling average of millions of service units (MSUs). The mainframe computing system also includes a dynamic capping policy for the central processor complex stored in non-transitory memory, the dynamic capping policy identifying a maximum MSU limit, a maximum cost limit, a subset of the plurality of billing entities, and, for each identified billing entity, information from which to determine an MSU entitlement value and a cost entitlement value. The mainframe computing system may also include a dynamic capping master that adjusts the respective capacity limits of the subset of the plurality of billing entities at scheduled intervals based on the dynamic capping policy to favor billing entities having high-importance workload within the maximum MSU limit and maximum cost limit.

These and other aspects can include one or more of the following features. For example, adjusting the respective capacity limits can include determining a pool of service units that can be shared, the pool of service units that can be shared representing MSUs from billing entities that have respective rolling averages that are less than respective MSU entitlement values, determining a cost pool for the pool of service units, the cost pool representing cost entitlement unused from billing entities that have respective rolling averages that are less than respective MSU entitlement values, determining a favored billing entity of the subset of billing entities that has a rolling average greater than its respective MSU entitlement value and lowest low-importance workload percentage, and adjusting the capacity limit for the favored billing entity above the MSU entitlement value using borrowed MSUs, the borrowed MSUs being bounded by the available pool of service units and the available cost pool. In some implementations, the capacity limit for a billing entity that has a rolling average less than the MSU entitlement is set to the rolling average plus a buffer value and the difference between the capacity limit and the MSU entitlement is added to the pool of service units and the product of an MSU cost and the difference between the capacity limit and the MSU entitlement is added to the cost pool. In some implementations, bounding the borrowed MSUs includes determining a borrowed cost for the borrowed MSUs, the borrowed cost being equal to the product of the borrowed MSUs and an MSU cost for the favored billing entity, determining whether the borrowed cost is greater than the cost pool, reducing the cost pool by the borrowed cost when the borrowed cost is not greater than the cost pool, and reducing the borrowed MSUs when the borrowed cost is greater than the cost pool.

As another example, the cost entitlement is calculated from an MSU cost for the identified billing entity and the MSU entitlement value. In some implementations, the MSU cost represents a relative value. In some implementations, the MSU cost represents a value calculated based on a prior bill for the mainframe system.

According to one aspect, a method of adjusting capacity limits for billing entities identified in a dynamic capping policy on a mainframe is provided. The dynamic capping policy may include, for each billing entity identified in the policy, information from which to determine a millions of service unit (MSU) entitlement value and a cost entitlement value. The method may include determining a pool of service units from billing entities that have respective rolling averages under respective MSU entitlement values, determining a pool of billing entities that have respective rolling averages above respective MSU entitlement values, each billing entity in the pool having a priority assigned, and determining a cost pool based on unused cost entitlement units from billing entities that have respective rolling averages under respective MSU entitlement values. The method may further include determining, from the pool of billing entities, a favored billing entity that has a highest priority and a lowest deficit ratio, adjusting the capacity limit for the favored billing entity above the MSU entitlement value with borrowed MSUs from the pool of service units, the borrowed MSUs being bounded by the cost pool, and repeating determining a favored billing entity and adjusting until either the pool of service units is empty or the cost pool is empty.

These and other aspects can include one or more of the following features. For example, determining the pool of service units can include initializing the service unit pool to a MSU limit for the dynamic capping policy, for billing entities having a respective rolling average greater than or equal to the respective MSU entitlement, subtracting the respective MSU entitlement from the service unit pool, and for billing entities having a respective rolling average less than the respective MSU entitlement, subtracting the respective rolling average plus a buffer from the service unit pool. As another example, determining the pool of MSUs can include initializing the cost pool to a cost limit for the dynamic capping policy, for billing entities having a respective rolling average greater than or equal to the respective MSUs entitlement, subtracting the product of the respective MSU entitlement and an MSU cost from the cost pool, and for billing entities having a respective rolling average less than the respective MSU entitlement, subtracting the product of the respective rolling average plus a buffer and a respective MSU cost from the cost pool. In some implementations, the MSU cost represents a relative value or a value calculated based on a prior bill for the mainframe.

According to one aspect, a method includes obtaining workload data from each of a plurality of billing entities identified in a dynamic capping policy, a billing entity being a logical partition of a mainframe computing system or a group of such logical partitions, each billing entity having a respective capacity limit, and the workload data including a rolling average of millions of service units (MSUs), determining an entity pool, a service unit pool, and a cost pool for the plurality of billing entities based on, for each billing entity, the respective rolling average MSUs, a respective MSU entitlement value, and a respective MSU cost, and dynamically adjusting capacity limits of the plurality of billing entities based on, the entity pool, the service unit pool, and the cost pool.

These and other aspects can include one or more of the following features. For example, adjusting the respective capacity limits can include determining a favored billing entity of the plurality of billing entities that has a rolling average greater than its respective MSU entitlement value and a lowest low-importance workload percentage; and adjusting the capacity limit for the favored billing entity above the MSU entitlement value using borrowed MSUs, the borrowed MSUs being bounded by the service unit pool and the cost pool. In some implementations, as part of determining the entity pool, the method can include determining that a billing entity that has a rolling average less than the MSU entitlement, setting, responsive to the determining, the capacity limit for to the rolling average plus a buffer value, adding the difference between the capacity limit and the MSUs entitlement to the service unit pool, and adding the product of the MSU cost and the difference between the capacity limit and the MSU entitlement is added to the cost pool. In some implementations, bounding the borrowed MSUs includes determining a borrowed cost for the borrowed MSUs, the borrowed cost being equal to the product of the borrowed MSUs and an MSU cost for the favored billing entity, determining whether the borrowed cost is greater than the cost pool, reducing the cost pool by the borrowed cost when the borrowed cost is not greater than the cost pool, and reducing the borrowed MSUs when the borrowed cost is greater than the cost pool.

As another example, the MSU cost for a billing entity represents a relative value or a value calculated based on a prior bill for the mainframe system. As another example, adjusting the respective capacity limits can include determining that a billing entity that has a rolling average less than MSU entitlement; and setting the respective capacity limit to the rolling average plus a buffer.

Implementations of the various techniques described herein may be implemented in digital electronic circuitry, or in computer hardware, firmware, software, or in combinations of them. Implementations may implemented as a computer program product, i.e., a non-transitory computer program tangibly embodied in an information carrier, e.g., in a machine-readable storage device (e.g., a computer-readable medium, a tangible computer-readable medium), for processing by, or to control the operation of, data processing apparatus, e.g., a programmable processor, a computer, or multiple computers. In some implementations, a non-transitory tangible computer-readable storage medium can be configured to store instructions that when executed cause a processor to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps are not limited to the order illustrated by example processes herein.

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) display device, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A mainframe computing system comprising:
a central processor complex;
at least two billing entities, each billing entity being a logical partition or a group of logical partitions of the mainframe computing system;
a user interface configured to set up and maintain a dynamic capping policy to control how a workload manager schedules work performed by the central processor complex on the mainframe computing system, the workload manager tracking a rolling average of millions of service units (MSUs) for each of the billing entities, the user interface being configured to:
display an MSU limit for the billing entities,
display, for each of the billing entities, a respective MSU entitlement, and a respective MSU cost, and
store the dynamic capping policy in a memory, the dynamic capping policy including the MSU limit, and information from which to determine the respective MSU entitlement, and the respective MSU cost for each billing entity for the at least two billing entities; and
a dynamic capping master configured to:
determine a maximum cost limit for the dynamic capping policy using the respective MSU costs, and
monitor and adjust capacity limits of the billing entities, wherein the workload manager schedules work within the capacity limits such that the central processor complex executes the work without exceeding the maximum cost limit and the MSU limit, the monitoring and adjusting being bounded by cost entitlement unused from billing entities having respective rolling averages that are less than respective MSU entitlement values.

2. The mainframe computing system of claim 1, wherein the user interface is further configured to display an indication of when low-importance work is disfavored during the monitoring and adjusting.

3. The mainframe computing system of claim 2, wherein the indication is used in selecting an order in which the dynamic capping master adjusts the capacity limits.

4. The mainframe computing system of claim 1, wherein the information from which to determine the respective MSU entitlement includes:
a respective proportion for each of the at least two billing entities; and
the MSU limit,
wherein the respective MSU entitlement for each billing entity of the at least two billing entities is calculated using the respective proportion, a total of all proportions, and the MSU limit.

5. The mainframe computing system of claim 1, wherein the information used to determine the respective MSU entitlement is a value for the respective MSU entitlement.

6. The mainframe computing system of claim 1, wherein obtaining the maximum cost limit includes:
calculating a respective cost entitlement for each billing entity of the at least two billing entities, using the respective MSU entitlement and the respective MSU cost; and
setting the maximum cost limit to a sum of the respective cost entitlements.

7. The mainframe computing system of claim 1, wherein the respective MSU costs are selected by a user of the mainframe computing system.

8. The mainframe computing system of claim 1, wherein the respective MSU costs represent values that are based on a prior bill for the mainframe computing system.

9. The mainframe computing system of claim 1, wherein the respective MSU cost for a billing entity represents a relative cost compared to other billing entities.

10. A method of adjusting respective capacity limits for each of a plurality of billing entities identified in a dynamic capping policy on a mainframe, the method comprising:
obtaining an MSU limit for the dynamic capping policy;
obtaining, for each of the plurality of billing entities, a respective MSU entitlement and a respective MSU cost for the dynamic capping policy;
determining a maximum cost limit for the plurality of billing entities that is based on the respective MSU entitlements and the respective MSU costs;
obtaining a respective rolling average of MSUs for each of the plurality of billing entities, the respective rolling average being for a time period; and
adjusting, on a periodic basis, capacity limits of the plurality of billing entities based on the dynamic capping policy, wherein the adjusting is bounded by cost entitlement unused from billing entities having respective rolling averages that are less than respective MSU entitlement values,
wherein a workload manager executing on the mainframe schedules work within the capacity limits so that a central processor complex for the mainframe executes the work without exceeding the maximum cost limit and the MSU limit.

11. The method of claim 10, wherein adjusting the capacity limits comprises:
determining an entity pool, a service unit pool, and a cost pool for the plurality of billing entities based on, for each billing entity, the respective rolling average of MSUs, a respective MSU entitlement value, and a respective MSU cost; and
dynamically adjusting the capacity limits of the plurality of billing entities based on, the entity pool, the service unit pool, and the cost pool.

12. The method of claim 11, wherein adjusting the capacity limits includes:
determining a favored billing entity of the plurality of billing entities that has a rolling average greater than its respective MSU entitlement value and a lowest low-importance workload percentage; and
adjusting a capacity limit for the favored billing entity above the respective MSU entitlement value using borrowed MSUs, the borrowed MSUs being bounded by the service unit pool and the cost pool.

13. The method of claim 10, wherein the period is less than 10 minutes and the time period is at least one hour.

14. The method of claim 10, wherein the MSU cost represents a value that is based on a prior bill for MSUs used on the mainframe.

15. The method of claim 10, wherein determining the maximum cost limit includes:
determining, for each of the plurality of billing entities, a respective cost entitlement by determining the product of the respective MSU entitlement and the respective MSU cost; and
determining a total of the respective cost entitlements.

16. The method of claim 10, wherein the respective MSU cost for a billing entity represents a relative cost compared to other billing entities.

17. The method of claim 10, wherein obtaining the respective MSU entitlement includes:

obtaining a respective proportion for each of at least two billing entities from among the plurality of billing entities; and calculating the respective MSU entitlement for each billing entity of the at least two billing entities using the respective proportion, a total of all proportions, and the MSU limit.

18. A method comprising:

determining that a billing entity from among a plurality of billing entities identified in a dynamic capping policy on a mainframe has a rolling average of millions of service units (MSUs) that exceeds an MSU entitlement value in the dynamic capping policy;

determining a desired quantity of borrowed MSUs for the billing entity, the desired quantity representing a difference between the rolling average and the MSU entitlement value;

determining that a pool of service units includes at least the desired quantity of borrowed MSUs, the pool of service units representing MSUs from billing entities of the plurality of billing entities that have respective rolling averages that are less than respective MSU entitlement values;

reducing the desired quantity of borrowed MSUs for the billing entity responsive to determining that a cost of the desired quantity of borrowed MSUs for the billing entity exceeds a cost pool, the cost pool representing cost entitlement unused from billing entities of the plurality of billing entities that have respective rolling averages that are less than respective MSU entitlement values; and adjusting a capacity limit for the billing entity to include the reduced desired quantity of borrowed MSUs, wherein a workload manager schedules work for the billing entity using the capacity limit.

19. The method of claim 18, further comprising:

determining the pool of service units by totaling MSUs representing the difference between respective MSU entitlement values and respective rolling averages for billing entities having respective MSU entitlement values that are higher than the respective rolling averages; and determining the cost pool by totaling, for each billing entity donating MSUs to the pool of service units, the product of MSUs representing the difference for the billing entity and a respective MSU cost for the billing entity.

20. The method of claim 18, further comprising:

determining the billing entity is a favored billing entity from among billing entities that have respective rolling averages greater than respective MSU entitlement values, wherein the favored billing entity has a lowest low importance workload percentage.

\* \* \* \* \*